(12) United States Patent
Chen

(10) Patent No.: US 12,408,101 B2
(45) Date of Patent: Sep. 2, 2025

(54) INFORMING AN UPPER LAYER OF BARRING ALLEVIATION FOR MULTIPLE ACCESS CLASSES

(71) Applicant: Google LLC, Mountain View, CA (US)

(72) Inventor: Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 926 days.

(21) Appl. No.: 17/286,481

(22) PCT Filed: Nov. 25, 2019

(86) PCT No.: PCT/US2019/062948
§ 371 (c)(1),
(2) Date: Apr. 18, 2021

(87) PCT Pub. No.: WO2020/112606
PCT Pub. Date: Jun. 4, 2020

(65) Prior Publication Data
US 2021/0392569 A1    Dec. 16, 2021

Related U.S. Application Data

(60) Provisional application No. 62/773,123, filed on Nov. 29, 2018.

(51) Int. Cl.
*H04W 48/16* (2009.01)
*H04W 68/00* (2009.01)
*H04W 76/10* (2018.01)

(52) U.S. Cl.
CPC ......... *H04W 48/16* (2013.01); *H04W 68/005* (2013.01); *H04W 76/10* (2018.02)

(58) Field of Classification Search
None
See application file for complete search history.

(56) References Cited

U.S. PATENT DOCUMENTS

| 8,817,746 B2 | 8/2014 | Chen |
| 2010/0074170 A1 | 3/2010 | Chen |

(Continued)

FOREIGN PATENT DOCUMENTS

| WO | 2013141600 | 9/2013 |
| WO | 2015116718 | 8/2015 |

(Continued)

OTHER PUBLICATIONS

Intel Corporation "TS36.331 CR on [104#23][LTE/5GC] Capture NR agreements", 3GPP Draft; R2-1819116 TS36.331 referred to herein as "3GPP", Nov. 2018, 3GPP Draft, R2-1819116 TS36.331, all pages.*

(Continued)

*Primary Examiner* — Adnan Baig
(74) *Attorney, Agent, or Firm* — Colby Nipper PLLC

(57) ABSTRACT

This document describes techniques and devices for informing an upper layer of barring alleviation for multiple access classes. In some situations, a radio resource control (RRC) layer of a user equipment (UE) can provide to an upper layer of the UE a barring message that indicates at least two access classes are barred in response to receiving a rejection message from a random access network (RAN). Responsive to the RRC layer determining that the at least two access classes are no longer barred, the RRC layer can provide the upper layer an alleviation message that indicates barring of the least two access classes is alleviated. By informing the upper layer of multiple access classes using the alleviation message, miscommunications regarding barring alleviation of the access classes can be avoided between the RRC layer and the upper layer.

20 Claims, 10 Drawing Sheets

(56) References Cited

U.S. PATENT DOCUMENTS

| | | | |
|---|---|---|---|
| 2010/0184448 A1 | 7/2010 | Wu | |
| 2015/0072689 A1 | 3/2015 | Wu | |
| 2019/0082376 A1 | 3/2019 | Hong et al. | |
| 2019/0223081 A1 | 7/2019 | Cheng | |
| 2019/0342821 A1* | 11/2019 | Kim | H04W 74/0833 |
| 2019/0380086 A1* | 12/2019 | Lee | H04W 48/16 |
| 2020/0178162 A1* | 6/2020 | Wallentin | H04W 48/16 |
| 2021/0160953 A1* | 5/2021 | Mildh | H04W 76/18 |
| 2021/0385727 A1* | 12/2021 | Ohlsson | H04W 48/02 |

FOREIGN PATENT DOCUMENTS

| | | |
|---|---|---|
| WO | 2017078424 | 5/2017 |
| WO | 2018128458 | 7/2018 |
| WO | 2018165909 | 9/2018 |
| WO | 2020112606 | 6/2020 |

OTHER PUBLICATIONS

"Foreign Office Action", IN Application No. 202147021079, Feb. 24, 2022, 5 pages.
"LTE; Evolved Universal Terrestrial Radio Access (E-UTRA); Radio Resource Control (RRC); Protocol specification", LTE; (3GPP TS 36.331 version 15.3.0 Release 15), Oct. 2018, 916 pages.
"3GPP TS 38.331 V15.6.0", 3GPP TS 38.331 V15.6.0 (Jun. 2019), Jun. 2019, 519 pages.
"International Preliminary Report on Patentability", Application No. PCT/US2019/062948, Mar. 16, 2021, 10 pages.
"International Search Report and Written Opinion", PCT Application No. PCT/US2019/062948, Feb. 20, 2020, 19 pages.
"Radio Resource Control (RRC)", Radio Resource Control (RRC); Protocol specification; (3GPP TS 38.331 version 15.3.0 Release 15), Oct. 2018, 441 pages.
"Radio Resource Control (RRC); Protocol specification", 3GPP TS 38.331 V15.6.0, Oct. 2018, 441 pages.
"TS36.331 CR on Capture NR Agreements", 3GPP TSG-RAN WG2 Meeting #104, Spokane, USA, Nov. 12-16, 2018, 41 pages.
"Written Opinion of the IPEA", PCT Application No. PCT/US2019/062948, Sep. 8, 2020, 11 pages.

* cited by examiner

INFORMING AN UPPER LAYER OF BARRING ALLEVIATION FOR MULTIPLE ACCESS CLASSES

RELATED APPLICATION(S)

This application is a national stage entry of International Application No. PCT/US2019/062948, filed Nov. 25, 2019, which claims the benefit of U.S. Provisional Application No. 62/773,123, filed Nov. 29, 2018, the disclosures which are incorporated herein by reference in their entirety.

BACKGROUND

The evolution of wireless communication to 5th Generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface is defined as 5G New Radio (5G NR). To provide these services, the 5G standards enable a network to manage congestion based on access classes.

In general, an access class indicates a purpose and priority associated with a user equipment (UE) connecting to the network. A higher-priority access class, for example, may be used for making emergency calls or may be assigned to a higher-priority user such as an emergency responder (e.g., a police officer or a firefighter). In contrast, a lower-priority access class may be used for non-emergency reporting of a remote humidity sensor's reading.

If the network becomes congested, the network can deny a lower-priority UE's request to establish a connection using a lower-priority access class in order to allocate network resources to higher-priority UEs or other UEs establishing connections using higher-priority access classes. After a network denial of an establishment request, a set of lower-priority access classes (including the lower-priority access class of the establishment request) is considered barred at that UE for a predetermined amount of time. After the predetermined amount of time has passed, the UE can again attempt to use a lower-priority access class to connect to the network. In this manner, barring of the set of lower-priority access classes can be alleviated when congestion decreases.

Sometimes, however, miscommunications can occur between different layers of a protocol stack implemented by a UE. These miscommunications can cause one of the layers to be unaware that barring of an access class is alleviated. Consequently, the UE may be less likely to attempt to establish a connection having that access class, which can result in an unintended limitation of services that the UE may provide for a user.

SUMMARY

Techniques and apparatuses are described for informing an upper layer of barring alleviation for multiple access classes. In some situations, a radio resource control (RRC) layer of a user equipment (UE) can provide to an upper layer of the UE a barring message that indicates a group of at least two access classes are barred. This can be in response to the RRC layer receiving a rejection message from a network that denies a request to establish a connection associated with a first access class of the group of at least two access classes. In this case, the rejection message causes multiple access classes to be barred as a group. Responsive to the RRC layer determining that the group of at least two access classes are no longer barred due to the rejection message, the RRC layer can provide the upper layer an alleviation message that indicates barring of the group of at least two access classes is alleviated. This can enable the upper layer to direct the RRC layer to attempt to establish a second connection associated with one access class from the group of at least two access classes (e.g., with the first access class or a second access class). By informing the upper layer of multiple access classes using the alleviation message, miscommunications regarding barring alleviation can be avoided between the RRC layer and the upper layer.

Aspects described below include a method for informing an upper layer of a user equipment of barring alleviation for multiple access classes. As part of this method, the user equipment performs operations that include determining that a first access class is not barred at a radio resource control layer of the user equipment. The method also includes sending, by the radio resource control layer, a first connection request message to a network. The first connection request message requests permission to establish a first wireless connection associated with the first access class. The method further includes receiving a rejection message from the network at the radio resource control layer. The rejection message denies the request to establish the first wireless connection. Responsive to receiving the rejection message, the method includes providing, from the radio resource control layer to the upper layer, a first barring message that indicates barring of at least the first access class and a second access class. Responsive to receiving the rejection message, the method includes activating, at the radio resource control layer, a common bar timer. Responsive to the common bar timer becoming inactive, the method includes determining that the barring of at least the first access class and the second access class is alleviated based on respective specific bar timers associated with at least the first access class and the second access class being inactive. The method also includes providing, from the radio resource control layer to the upper layer, a first alleviation message that indicates alleviation of the barring of the first access class and the second access.

Aspects described below also include a user equipment with a radio-frequency transceiver. The user equipment also includes a processor and memory system configured to perform any of the described methods.

Aspects described below also include a system with means for informing an upper layer of barring alleviation for multiple access classes.

A further aspect includes a processor-readable medium having instructions stored thereon that, when executed by a processor, cause the processor to perform the method.

BRIEF DESCRIPTION OF THE DRAWINGS

Apparatuses of and techniques for informing an upper layer of barring alleviation for multiple access classes are described with reference to the following drawings. The same numbers are used throughout the drawings to reference like features and components.

DETAILED DESCRIPTION

Overview

Figure 1:
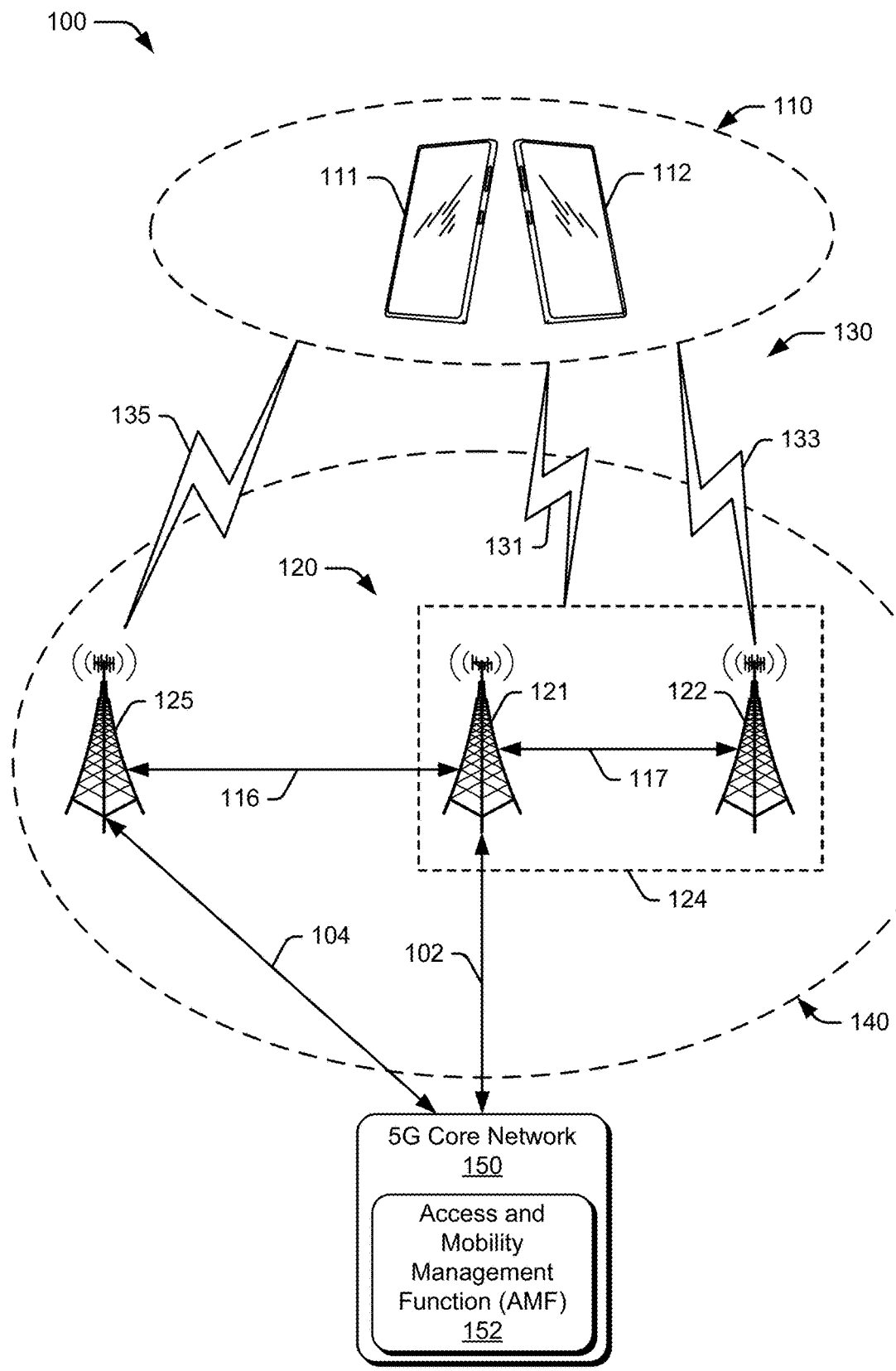
FIG. 1 illustrates an example wireless network environment in which informing an upper layer of barring alleviation for multiple access classes can be implemented.

Techniques and apparatuses are described for informing an upper layer of barring alleviation for multiple access classes. Sometimes miscommunications can occur between different layers of a protocol stack implemented by a user equipment (UE), such as between a radio resource control (RRC) layer of the UE and an upper layer of the UE. These miscommunications can result in the upper layer being unaware that barring of an access class is alleviated. Consequently, the UE may be less likely to attempt to establish a connection associated with the previously barred access class, which can result in an unintended limitation of services that the UE may provide for a user.

To address this issue, techniques and apparatuses are described for informing an upper layer of barring alleviation for multiple access classes. In some situations, the RRC layer can provide to the upper layer a barring message that indicates a group of at least two access classes are barred. This can be in response to the RRC layer receiving a rejection message from a network that denies a request to establish a connection associated with a first access class of the group of at least two access classes. In this case, the rejection message causes multiple access classes to be barred as a group. Responsive to the RRC layer determining that the group of at least two access classes are no longer barred due to the rejection message, the RRC layer can provide the upper layer an alleviation message that indicates barring of the group of at least two access classes is alleviated. This can enable the upper layer to direct the RRC layer to attempt to establish a second connection associated with one access class of the group of at least two access classes (e.g., with either the first access class or a second access class). By informing the upper layer of multiple access classes using the alleviation message, miscommunications regarding barring alleviation can be avoided between the RRC layer and the upper layer.

Implementations in accordance with the present disclosure can have some, or all, of the following advantages. The provision of a barring message, by the RRC layer to an upper layer, that indicates barring of multiple access classes can save computational power and battery power at the UE. For example, the barring message can prevent the upper layer from sending superfluous request messages to the RRC layer in respect of the second access class (and/or other access classes) after the network has rejected a request to establish a connection associated with the first access class. The provision of an alleviation message, by the RRC layer to an upper layer, that indicates alleviation of barring of multiple access classes can allow the upper layer to make better use of available radio resources following the alleviation. For example, the alleviation message can ensure that the upper layer is informed of each and every access class for which barring has been alleviated, thus avoiding miscommunications between the RRC layer and the upper layer that could otherwise cause the upper layer not to utilize available radio resources. Alternatively or in addition, the alleviation message can inform the upper layer when barring of a particular access class has been alleviated before expiry of a specific bar timer for that particular access class, thus allowing the upper layer to utilize newly-available radio resources. Other advantages will become apparent from the following description.

Example Environment

FIG. 1 illustrates an example environment 100, which includes a user equipment (UE) 110 that can communicate with a base station 120 that acts as a serving cell (serving base station 120) through one or more wireless communication links 130 (wireless link 130). For simplicity, the UE 110 is implemented as a smartphone but may be implemented as any suitable computing or electronic device, such as a mobile communication device, a modem, cellular phone, mobile phone, gaming device, navigation device, media device, laptop computer, desktop computer, tablet computer, smart appliance, vehicle-based communication system, or an Internet of Things (IoT) device, such as a sensor or an actuator.

A macrocell, microcell, small cell, picocell, and the like, or any combination thereof may implement the base station 120 (e.g., an Evolved Universal Terrestrial Radio Access Network Node B, E-UTRAN Node B, evolved Node B, eNodeB, eNB, Next Generation eNB, ng-eNB, Next Generation Node B, gNode B, gNB, or the like), a base station transceiver system, a Wireless Local Access Network (WLAN) router, a satellite, a terrestrial television broadcast tower, an access point, a peer-to-peer device, another smartphone acting as a base station, and so forth.

The base station 120 communicates with the UE 110 (e.g., UE 111 or UE 112) using the wireless link 130 (e.g., wireless link 131 or wireless link 135), which may be implemented as any suitable type of wireless link. The wireless links 130 include control and data communication, such as downlink of data and control information communicated from the base station 120 to the UE 110, uplink of other data and control information communicated from the UE 110 to the base station 120, or both. The wireless links 130 may include one or more wireless links (e.g., radio links) or bearers implemented using any suitable communication protocol or standard, or combination of communication protocols or standards such as 3$^{rd}$ Generation Partnership Project Long-Term Evolution (3GPP LTE), 5G NR, and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, the multiple wireless links 130 may be configured for single-RAT dual connectivity or multi-RAT dual connectivity (MR-DC).

In FIG. 1, the UE 110 can communicate with one or more base stations 124 (illustrated as base stations 121 and 122) through one or more wireless links 130 (illustrated as wireless links 131 and 133). The wireless links 131 and 133 may be implemented using a same communication protocol or communication standard, or different communication protocols or communication standards. Sometimes the UE 110 may communicate with another base station 125 (neighbor base station 125) using a wireless link 135. The wireless link 135 may be implemented using the same communication protocol or communication standard, or a different communication protocol or communication standard, as the wireless link 131.

The base stations 120 (e.g., the base stations 121, 122, and 125, and any additional base stations not illustrated for clarity) are collectively a Radio Access Network 140 (e.g., RAN, Evolved Universal Terrestrial Radio Access Network, E-UTRAN, 5G NR RAN, or NR RAN). The base stations 121 and 125 in the RAN 140 are connected to a 5$^{th}$ Generation Core network 150 (5GC 150).

The base stations 121 and 125 connect, at 102 and 104 respectively, to the 5GC 150 through an NG2 interface for control-plane signaling and using an NG3 interface for user-plane data communications. In addition to connecting with the 5GC 150, the base stations 120 may communicate with each other. For instance, the base station 124 (e.g., base station 121) and the neighbor base station 125 can communicate using an Xn Application Protocol (XnAP), at 116, to exchange user-plane and control-plane data. Additionally, the base stations 121 and 122 can communicate using an Xn interface, or an X2 interface, at 117, to exchange user-plane and control-plane data.

The 5GC 150 includes an Access and Mobility Management Function 152 (AMF 152), which provides control-plane functions such as registration and authentication of multiple UE devices 110, authorization, and mobility management in the 5G NR network. The AMF 152 communicates with the base stations 120 in the RAN 140 and also communicates with multiple UEs 110, using the base stations 120.

Example Devices

Figure 2:
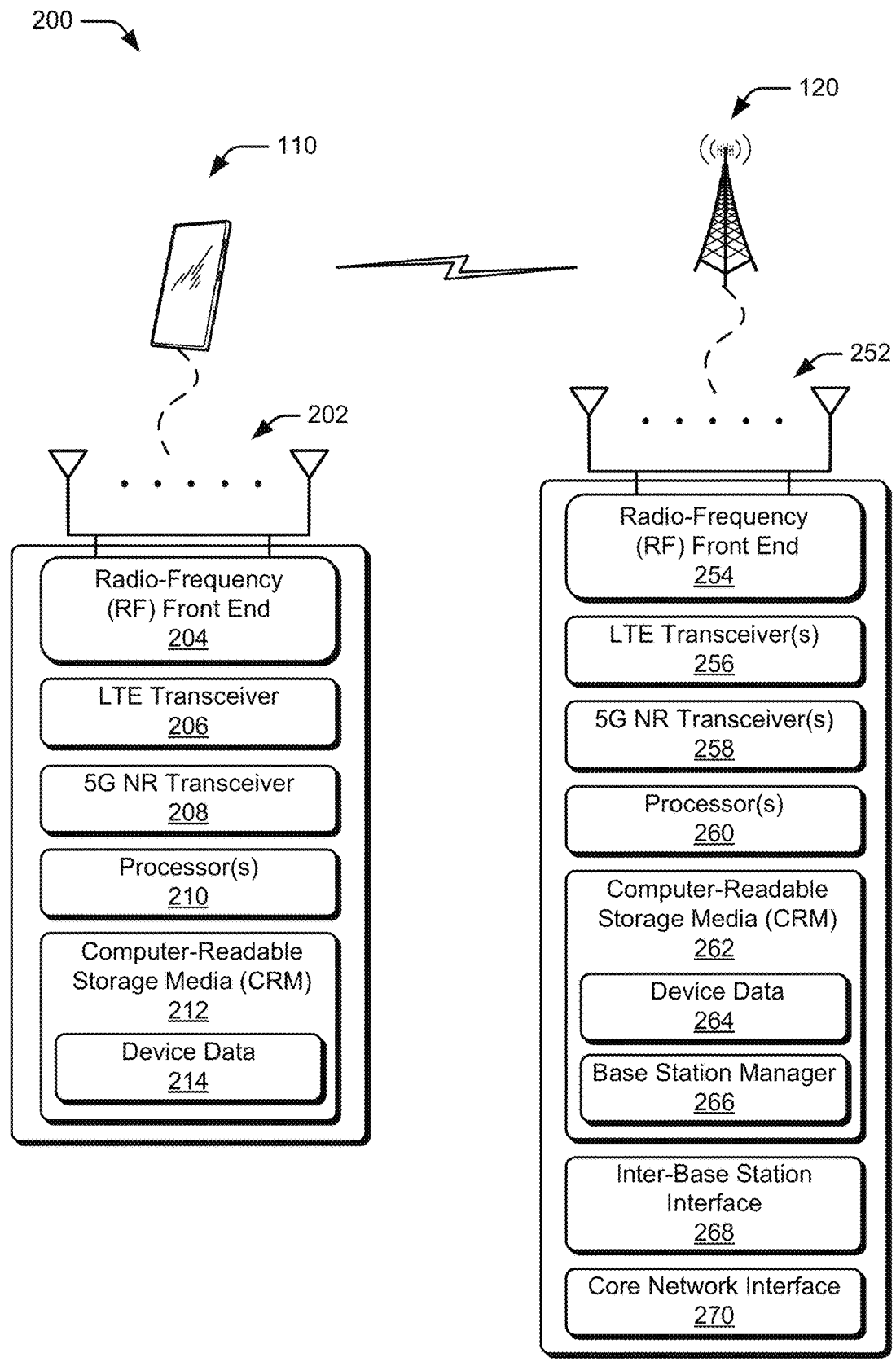
FIG. 2 illustrates an example device diagram of a user equipment and a base station for informing an upper layer of barring alleviation for multiple access classes.

FIG. 2 illustrates an example device diagram 200 of the UE 110 and the base station 120. The UE 110 and the base station 120 may include additional functions and interfaces omitted from FIG. 2 for the sake of clarity. The UE 110 includes antennas 202, a radio-frequency (RF) front end 204, an LTE transceiver 206, and a 5G NR transceiver 208 for communicating with one or more base stations 120 in the RAN 140. The RF front end 204 can couple or connect the LTE transceiver 206 and the 5G NR transceiver 208 to the antennas 202 to facilitate various types of wireless communication. The antennas 202 may include an array of multiple antennas that are configured similar to or different from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, and/or the 5G NR transceiver 208 may be configured to support beamforming for the transmission and reception of signals with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multi-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor 210 to enable user-plane communication, control-plane signaling, and user interaction with the UE 110.

The device diagram for the base station 120, shown in FIG. 2, includes a single network node (e.g., a gNB). The functionality of the base station 120 may be distributed across multiple network nodes or devices and may be distributed in any fashion suitable to perform the functions described herein. The base station 120 includes antennas 252, a radio-frequency (RF) front end 254, one or more LTE transceivers 256, and/or one or more 5G NR transceivers 258 for communicating with the UE 110. The RF front end 254 of the base station 120 can couple or connect the LTE transceivers 256 and the 5G NR transceivers 258 to the antennas 252 to facilitate various types of wireless communication. The antennas 252 may include an array of multiple antennas that are configured similar to or different from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also includes processor(s) 260 and computer-readable storage media 262 (CRM 262). The processor 260 may be a single-core processor or a multi-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by the processor 260 to enable communication with the UE 110.

The CRM 262 also includes a base station manager 266. Alternatively or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with the 5GC 150. The base station 120 includes an inter-base station interface 268, such as an Xn and/or X2 interface, to exchange user-plane and control-plane data with another base station 120 and manage communications between the base stations 120 with the UE 110. The base station 120 also includes a core network interface 270 to exchange information with core network functions and entities, such as those associated with the 5GC 150.

User Plane and Control Plane Signaling

Figure 3:
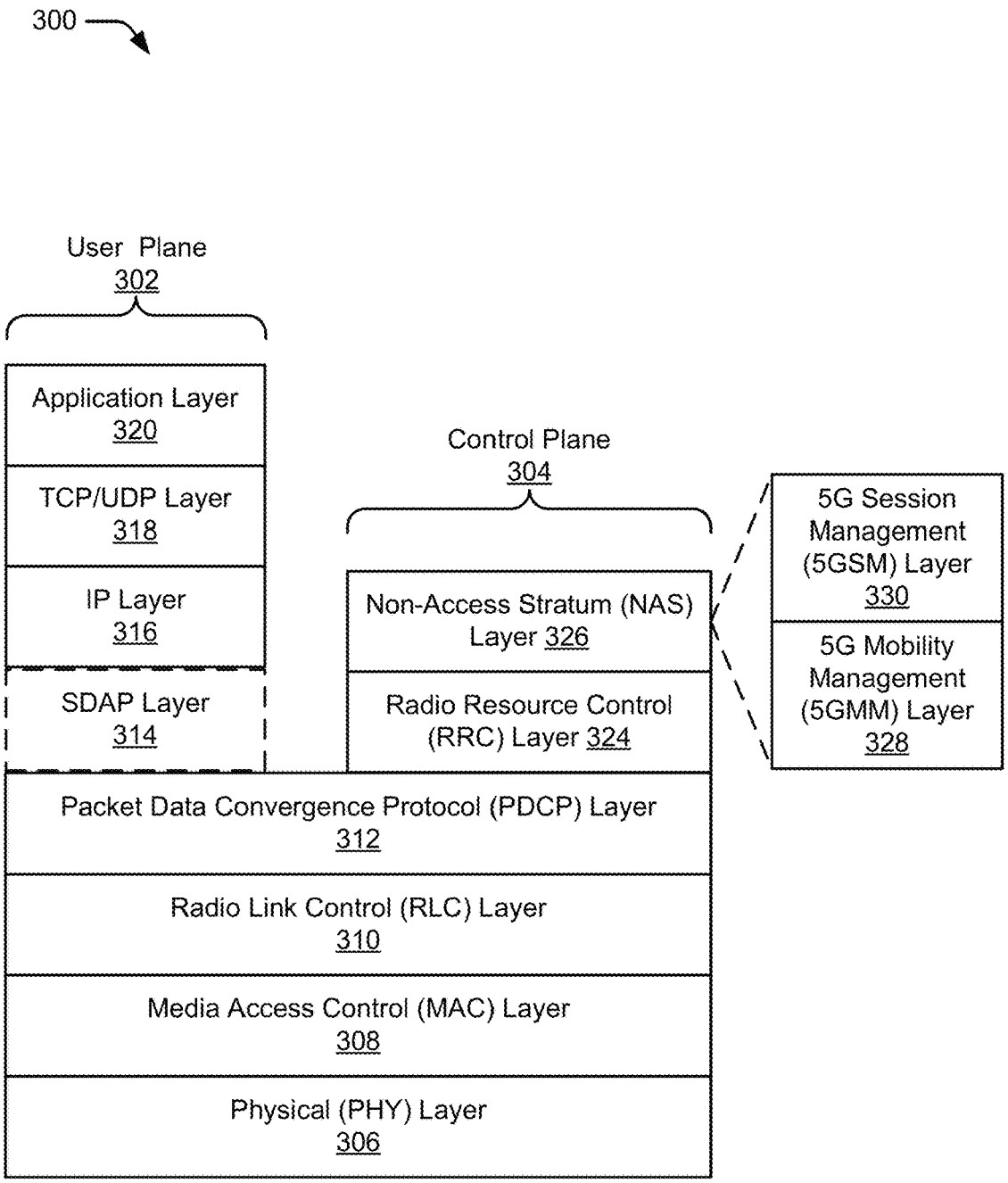
FIG. 3 illustrates an example block diagram of a wireless network stack model in which various aspects of informing an upper layer of barring alleviation for multiple access classes can be implemented.

FIG. 3 illustrates an example block diagram 300 of a wireless network stack model 300 that characterizes a communication system for the example environment 100, in which various aspects of informing an upper layer of barring alleviation for multiple access classes can be implemented. The wireless network stack 300 includes a user plane 302 and a control plane 304. Upper layers of the user plane 302 and the control plane 304 share common lower layers in the wireless network stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the wireless network stack 300. Generally, the PDCP layer 312 provides transfer of user plane 302 and control plane 304 data, header compression, ciphering, and integrity protection.

Above the PDCP layer 312, the wireless network stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320 that transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web-browsing content, video content, image content, audio content, social media content, and so forth.

The control plane 304 includes a Radio Resource Control (RRC) layer 324 and a Non-Access Stratum (NAS) layer 326. The RRC layer 324 establishes and releases connections and radio bearers, broadcasts system information, performs power control, and so forth. The RRC layer 324 also controls a resource control state of the UE 110 and directs the UE 110 to perform operations according to the resource control state. Example resource control states can include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., Wi-Fi).

The NAS layer 326 provides support for mobility management (e.g., using a $5^{th}$ Generation Mobility Management (5GMM) layer 328) and packet data bearer contexts (e.g., using a $5^{th}$ Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the wireless network stack 300 interacts with a corresponding peer layer or entity in the base station 120, a core network entity or function, and/or a remote service, to support user applications and control operation of the UE 110 in the RAN 140.

Informing an Upper Layer of Barring Alleviation for Multiple Access Classes

Figure 4:
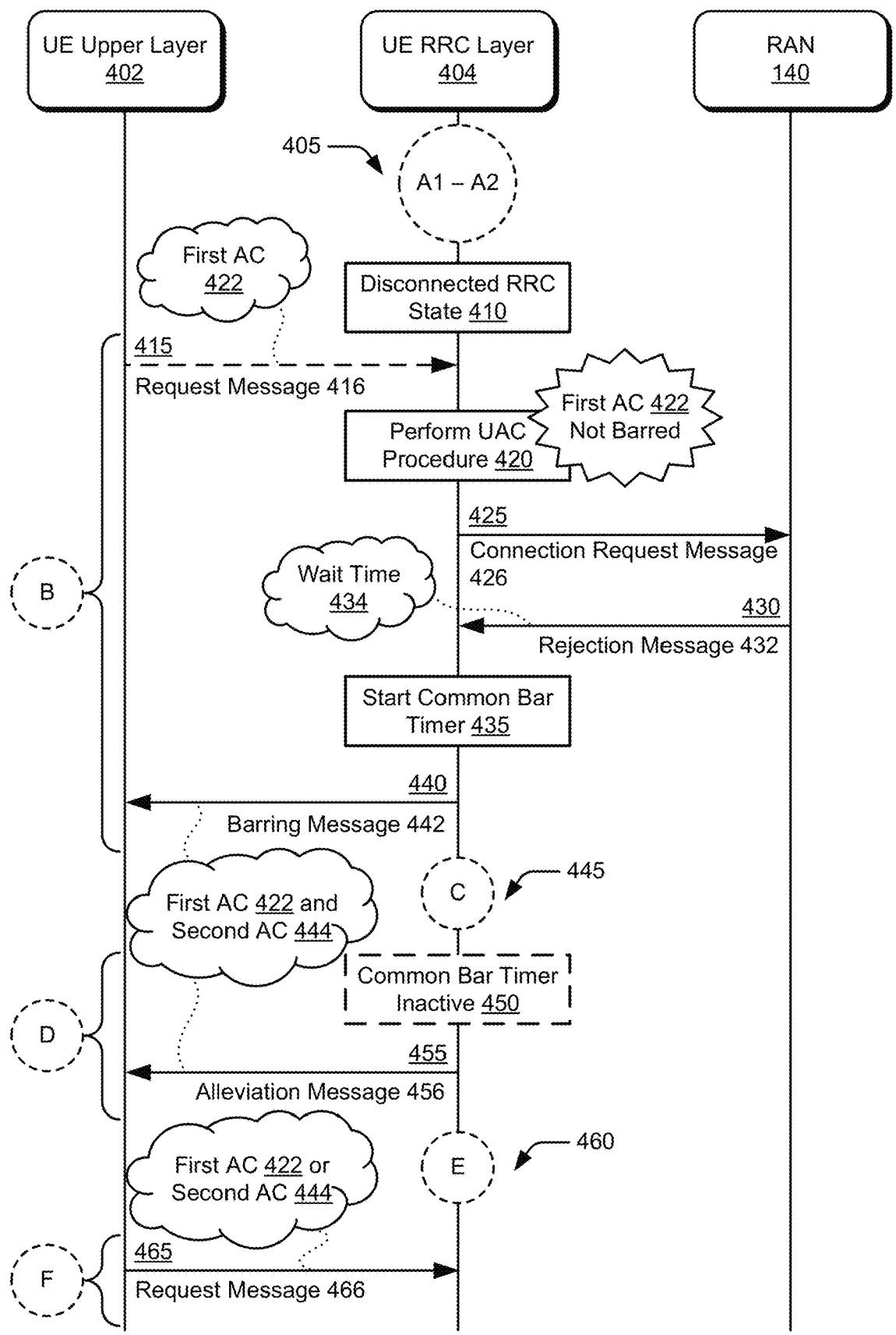
FIG. 4 illustrates details of example control transactions between entities for informing an upper layer of barring alleviation for multiple access classes.

FIG. 4 illustrates details of example control transactions between entities for informing an upper layer of a UE of barring alleviation at that UE for multiple access classes. In this example, communications are transmitted between various layers of the communication protocol stack described in FIG. 3 of a UE 110 and a RAN 140. For clarity, only a few layers of the wireless protocol stack of the UE 110 are illustrated, although more layers may be involved to efficiently process messages. In FIG. 4, example protocol layers in the UE 110 include a UE upper layer 402 and a UE RRC layer 404. The UE upper layer 402 can include the NAS layer 326 or the 5GMM layer 328 of FIG. 3. The UE 110 uses these protocol layers to communicate with corresponding protocol layers in the RAN 140. More generally, the term "upper layer" as used herein may refer to any layer of a wireless network stack that is above (or higher than) the UE RRC Layer 404.

Figure 5:
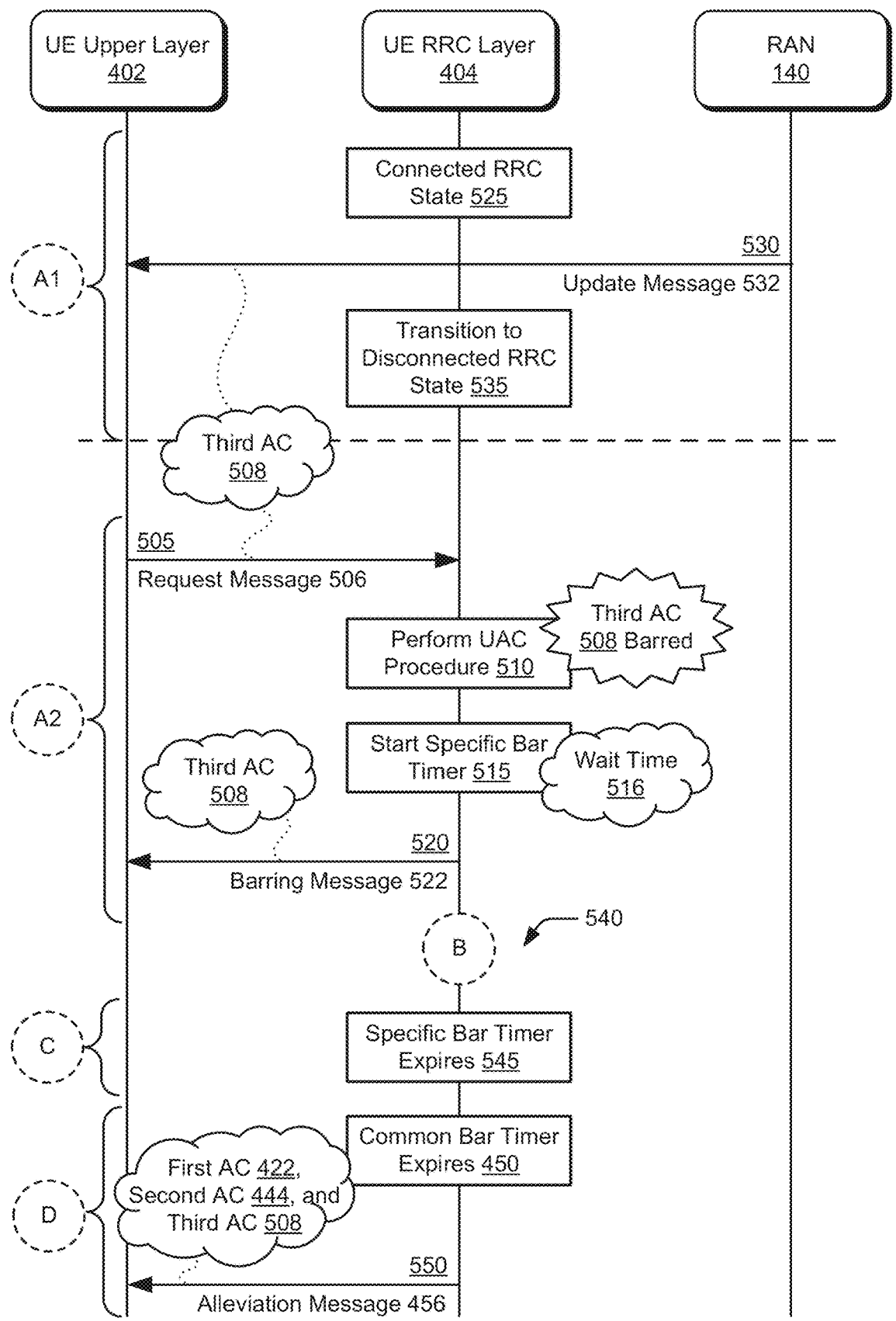
FIG. 5 illustrates details of example control transactions between entities informing an upper layer of barring alleviation for multiple access classes associated with different bar timers at a same time.

At 405, optional transactions identified by A1 through A2 can occur as further described in FIG. 5. At 410, the UE 110 is in a disconnected RRC state, such as the inactive state or the idle state. While in the disconnected RRC state, the UE

110 may attempt to establish (or re-establish) a connection with the RAN 140 using a particular access class (AC).

Each access class is associated with an access category type and has an access category number. The access category type can include a standardized access category type, such as a mobile-terminated (MT) access type, a delay-tolerant type, an emergency type, a mobile-originated (MO) signal type, a MO voice call (MO MMTel Voice) type, a MO video call (MO MMTel Video) type, a MO Short Message Service (SMS) and SMS over Internet Protocol (SMSoIP) type, a MO data type, or a RAN area update type. Other access category types can include an operator-defined access category type specified by the RAN 140. Example operator-defined access category types can include a data network name (DNN) type, a 5G QoS Identifier (5QI) type, an operating system (OS) identity (ID) or an OS application (App) ID of an application triggering the access attempt, a single network slice selection assistance information (S-NSSAI) type, or a standardized access category type as described above.

Access category numbers can include one number from a range of numbers, such as a number between zero and sixty-three. In some cases, different groups of access category numbers can be available to different entities. For example, access category numbers between zero and fifteen can be available to the UE 110, and access category numbers between thirty-two and sixty-three can be reserved for use by the RAN 140. In this example, access category numbers sixteen to thirty-one can be undefined or reserved for future use.

Access classes can also be categorized as non-exempt or exempt. In general, the RAN 140 can bar a non-exempt access class and cannot bar an exempt access class. A non-exempt access class may be considered barred if the RAN 140 informs the UE RRC layer 404 that connections using the non-exempt access class are temporarily unsupported. The RAN 140, for instance, can directly reject a request to establish a connection associated with the non-exempt access class to direct the UE RRC layer 404 to consider the non-exempt access class as temporarily barred. Generally, the RAN 140 may temporarily bar lower-priority UEs using non-exempt access classes (e.g., lower-priority access classes) and may not bar lower-priority UEs using exempt access classes (e.g., higher-priority access classes) during situations of high network traffic.

Example types of exempt access classes can include an exempt access class that enables paging of the UE 110, such as an access class associated with the MT access type and having an access category number of zero (referred to herein as AC0). Another example exempt access class that enables a user to make an emergency call can be associated with the emergency type and have an access category number of two (referred to herein as AC2). Example types of non-exempt access classes can include an access class associated with the MO signal type and having an access category number of three (referred to herein as AC3), another access class associated with the MO MMTel Voice type and having an access category number of four (referred to herein as AC4), an additional access class associated with the MO SMS and SMSoIP type and having an access category number of six (referred to herein as AC6), an access class associated with the MO data type and having an access category number of seven (referred to herein as AC7), another access class associated with the RAN area update type and having an access category number of eight (referred to herein as AC8), and the like. Sometimes a subscriber identification module (SIM) card of the UE 110 may include a list of exempt and/or non-exempt access classes that the UE 110 can use.

At 420, the UE RRC layer 404 performs a unified access control (UAC) procedure, defined by the 3GPP standard TS 38.331 specification, to determine if a first access class 422 (first AC 422) is barred or is not barred. This determination can be based on system information provided by the RAN 140 to the UE 110, such as information provided using a system information block (SIB) (e.g., SIB1). In particular, the system information can provide a barring threshold that the UAC procedure uses to determine whether or not the first access class 422 is barred. In general, the barring threshold affects a probability of the UE RRC layer 404 determining that the first access class 422 is barred. Using the system information, the RAN 140 can inform multiple UEs 110 of the barring thresholds for multiple access classes. In some temporal situations during which network traffic increases, the RAN 140 can update the system information to adjust the barring thresholds to increase a likelihood that one or more of the access classes are determined to be barred by any particular UE's RRC layer.

In some aspects, the UAC procedure can be performed in response to a decision by the UE RRC layer 404 to attempt to connect to the RAN 140. If the UE RRC layer 404 decides to perform a RAN area update procedure, for example, the first access class 422 can be AC8. As such, the UE RRC layer 404 performs the UAC procedure at 420 to determine if AC8 is barred.

In other aspects, the UE upper layer 402 can send (e.g., provide) a request message 416 to the UE RRC layer 404, as shown at 415. This can occur if a registration timer maintained by the UE upper layer 402 expires and the UE upper layer 402 has a MO message to send to the RAN 140. In this case, the first access class 422 can be AC3 and the UE RRC layer 404 can determine if AC3 is barred using the UAC procedure. In general, the request message 416 directs the UE RRC Layer 404 to attempt to establish a connection associated with the first access class 422 based on a UAC procedure determination by the UE RRC layer 404 that the first access class 422 is not barred.

In still other cases, the first access class 422 can be AC4 if the user attempts to make a voice call, AC6 if the user attempts to make a video call, or AC7 if the user attempts to send a text message. In FIG. 4, the UE RRC layer 404 determines that the first access class 422 is not barred using the UAC procedure and proceeds to attempt to connect to the RAN 140.

At 425, the UE RRC layer 404 transmits (e.g., sends or communicates) a connection request message 426 to the RAN 140. The connection request message 426 can be an RRC setup request message or an RRC resume request message (e.g., an RRCResumeRequest message or an RRCConnectionResumeRequest message). At this time, for this example, the network congestion is high, and even though the RAN 140 may have adjusted the barring threshold in the system information block to alleviate congestion, the UE RRC layer 404's UAC procedure at 420 determined that the first access class 422 is not barred. To further alleviate congestion, the RAN 140 can respond to the connect request message 426 by sending a rejection message 432 to the UE RRC layer 404. This rejection message 432 enables the RAN 140 to control access based on a UE 110's priority relative to other UEs. For instance, the RAN 140 can accept requests from higher-priority UEs 110 and reject requests from lower-priority UEs 110 or UEs requesting connections having lower priority access classes.

At 430, the UE RRC layer 404 receives the rejection message 432 from the RAN 140 that denies the UE RRC layer 404's request to establish a connection. The rejection message 432 can be an RRCReject message. The rejection message 432 enables the RAN 140 to manage network congestion and ensure that network resources are available for exempt access classes or higher-priority UEs 110. Generally, the rejection message 432 directs the UE RRC layer 404 to determine that a set of at least two access classes are barred temporarily. The at least two access classes can include the first access class 422 and a second access class 444 (second AC 444), both of which can be non-exempt access classes. Additionally, the rejection message 432 can include a wait time 434, which specifies a duration for which the UE RRC layer 404 determines that the at least two access classes are barred. In effect, the wait time 434 directs the UE RRC layer 404 to wait a determined amount of time before attempting to connect to the RAN 140 with any of the barred access classes.

Responsive to receiving the rejection message 432, the UE RRC layer 404 starts (e.g., initiates) a common bar timer at 435 with the wait time 434 and sends a barring message 442 to the UE upper layer 402 at 440. For drawing clarity reasons, the starting of the common bar timer is shown to occur before the sending of the barring message 442; alternatively, the barring message 442 can be sent before the common bar timer starts, or both can occur at the same time. In general, the UE RRC layer 404 uses the common bar timer to indicate a duration for which multiple access classes are barred at the UE. An example of a common bar timer is timer T302. Timer T302 is described by the 3GPP standard TS 38.331 specification. The barring message 442 indicates to the upper layer 402 that the at least two access classes (e.g., the first access class 422 and the second access class 444) are barred so that the upper layer 402 does not provide a request message for a barred access class (e.g., similar to message 416) to the UE RRC layer 404 until after the bar is alleviated. Pausing upper layer 402 request messages during a barred duration saves computational power at the RRC layer 404. This, in turn, can conserve power (e.g., battery power) at the UE 110. Accordingly, the common bar timer in element 435 is associated with the access classes identified in the barring message 442. As an example, the first access class 422 can be AC3 and the second access class 444 can be AC6. The UE RRC layer 404 can also not include some access classes, such as the exempt access classes AC0 and/or AC2, in the barring message 442. In this manner, the UE RRC layer 404 can inform the UE upper layer 402 that some access classes are barred (e.g., those that are listed in the barring message 442) and can inform the UE upper layer 402 that other access classes are not barred (e.g., those that are not listed in the barring message 442).

For simplicity, the transactions described between the optional sending of the request message 416 at 415 and the sending of the barring message 442 at 440 are generally identified by B. At 445, other optional transactions identified by C can occur, as further described in FIGS. 5, 8, and 9.

In some situations, the common bar timer becomes inactive (e.g., expires or stops) at 450. Responsive to the common bar timer becoming inactive, the UE RRC layer 404 sends an alleviation message 456 to the UE upper layer 402 at 455. The alleviation message 456 indicates that barring of the group of access classes (such as the first access class 422 and the second access class 444) are alleviated. This can re-enable the UE upper layer 402 to send a second request message associated with one of the previously-barred access classes (e.g., with either the first access class 422 or the second access class 444).

In some aspects, the UE RRC layer 404 can determine if at least one specific bar timer (to be described in association with FIG. 5) associated with at least one of the previously barred access classes is active or running. If the specific bar timer is not running (e.g., inactive) or had previously expired (as will be described in further detail in FIG. 5), the UE RRC layer 404 can indicate using the alleviation message 456 that barring of the access class associated with the specific bar timer is alleviated. By informing the UE upper layer 402 of the alleviation of multiple access classes that were previously barred (e.g., according to the barring message 442 or both barring messages 442 and 522), miscommunications regarding barring alleviation can be avoided between the UE RRC layer 404 and the UE upper layer 402.

In general, the transactions that occur between elements 450 and 455 are identified by D. Some variations within D can occur, as further described with respect to FIGS. 5 and 7-9. At 460, other optional transactions identified by E can occur, as further described in FIG. 6.

At 465, after the UE upper layer 402 received the alleviation message 456 re-enabling the upper layer to send request messages associated with a previously-barred access class, the UE upper layer 402 sends a second request message 466 to the UE RRC layer 404 to direct the UE 110 to attempt to establish a second connection associated with either the first access class 422 or the second access class 444. This causes the UE RRC layer 404 to perform a second UAC procedure and send a second connection request message if the RRC layer determines that the access class is not barred (not shown but similar to elements 420 and 425 above).

FIG. 5 illustrates details of example control transactions between entities for informing an upper layer of barring alleviation for multiple sets of access classes associated with different bar timers running during overlapping time periods. For simplicity, similar transactions previously described with respect to FIG. 4 are not shown explicitly. Instead, these transactions or operations are generically referenced using the identifiers A1 through F. In FIG. 5, the UE RRC layer 404 informs the UE upper layer 402 of multiple sets of access classes that are barred using multiple barring messages (e.g., using barring messages 442 and 522). Accordingly, the UE RRC layer 404 maintains multiple bar timers that are associated with the different sets of access classes. In this example, the multiple bar timers include the common bar timer of FIG. 4, which is associated with at least two access classes, and a specific bar timer, which is associated with a particular access class. In some situations, the third access class 508 can be a different access class from the at least two access classes (e.g., the first access class 422 and the second access class 444) discussed with respect to FIG. 4. In other situations, the third access class 508 and the second access class 444 can be a same access class.

Starting below the dashed horizontal line, at 505, the UE upper layer 402 sends a request message 506 that directs the UE RRC layer 404 to attempt to establish a connection associated with a third access class 508. At 510, the UE RRC layer 404 performs the UAC procedure at 510, similar to the UAC procedure performed at 420 in FIG. 4. In this case, however, the UAC procedure determines that the third access class 508 is barred.

Responsive to the determination that the third access class 508 is barred, the UE RRC layer 404 starts the specific bar timer with a second wait time 516 at 515 and sends a second barring message 522 at 520 to inform the UE upper layer 402 that the third access class 508 is barred. As an example, the specific bar timer can be timer T390 or timer T309. Timer T390 is described by the 3GPP standard TS 38.331 specification. The UE RRC layer 404 can determine the second wait time 516. In this case, a value of the second wait time 516 causes the specific bar timer to expire before the common bar timer expires.

In some cases, the third access class 508 can be an access class available to the UE 110, such as AC3. In other cases, the third access class 508 can be an access class that is reserved for the RAN 140. If the access class is reserved for the network, the RAN 140 can inform the UE upper layer 402 of the availability of this access class while the UE 110 is in a connected state, as described at the top of FIG. 5.

Prior to 505, the UE 110 is in a connected RRC state at 525. At 530, the RAN 140 sends an update message 532 (e.g., a configuration update command) to the UE upper layer 402 to inform the UE upper layer 402 of the third access class 508. As an example, the third access class 508 can be associated with the MO data type and have an access category number of thirty-seven (referred to herein as AC37). In some situations, the first access class 422 and the third access class 508 can be associated with a same access category type and have different access category numbers. At 535, the UE 110 transitions from the connected RRC state to the disconnected RRC state and operations continue as described above at A2 in FIG. 5.

After the RRC layer sends the barring message 522 at 520, other operations as identified by B in FIG. 4 can occur at 540. During this time, the UE RRC layer 404 receives the rejection message 432 from the RAN 140, starts the common bar timer in element 435, and sends the barring message 442 to the UE upper layer 402, as described in FIG. 4.

At 545, the specific bar timer expires before or during an expiration of the common bar timer at 450. Similar to FIG. 4, the UE RRC layer 404 sends the alleviation message 456 to the UE upper layer 402 at 550. In contrast to FIG. 4, however, the alleviation message 456 of FIG. 5 indicates that barring of the third access class 508 is alleviated in addition to the barring alleviation of the group of at least two access classes (e.g., the first access class 422 and the second access class 444). Although not explicitly shown, the UE 110 can perform operations identified by E and F in FIG. 4 after the UE RRC layer 404 sends the alleviation message 456 at 550. By informing the UE upper layer 402 of the alleviation of multiple sets of access classes that were previously barred according to multiple barring messages 442 (of FIG. 4) and 522 (of FIG. 5), miscommunications regarding barring alleviation can be avoided between the UE RRC layer 404 and the UE upper layer 402.

In a different situation not shown in FIG. 5, the common bar timer may not be running at 545 (e.g., the operations identified by B at 540 did not occur). In this case, the UE RRC layer 404 can determine that the common bar timer is not running and send an alleviation message to the UE upper layer 402 indicating that barring of the third access class 508 is alleviated in response to the specific bar timer expiring at 545.

Figure 6:
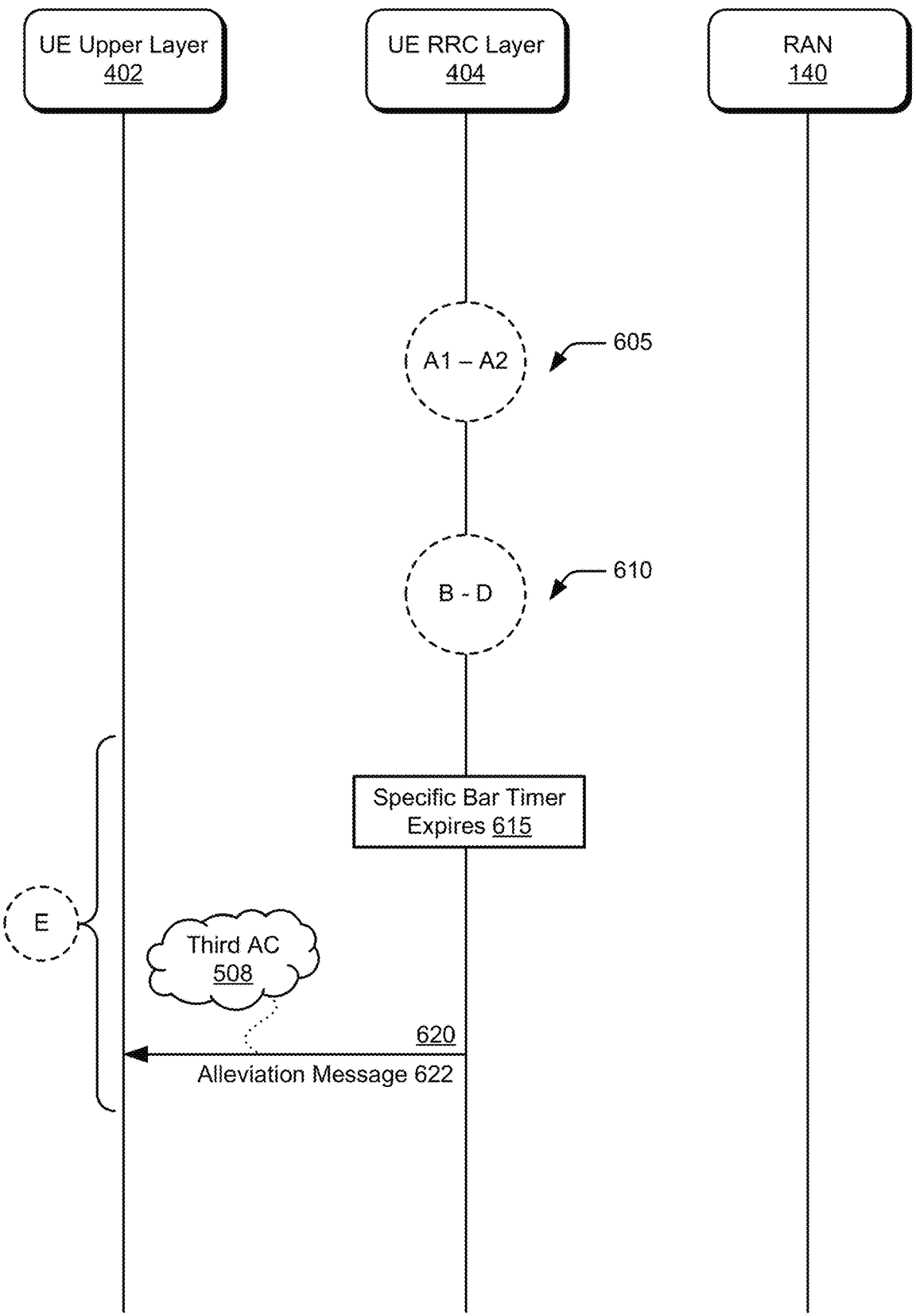
FIG. 6 illustrates details of example control transactions between entities informing an upper layer of barring alleviation for multiple access classes associated with different bar timers at different times.

FIG. 6 illustrates details of example control transactions between entities for informing an upper layer of barring alleviation for multiple sets of access classes associated with different bar timers that expire at different times. For simplicity, similar transactions previously described with respect to FIGS. 4 and 5 are not shown explicitly. Instead, these transactions or operations are generically referenced using the identifiers A1 through F. In FIG. 6, the UE RRC layer 404 informs the UE upper layer 402 of multiple sets of access classes that are barred using multiple barring messages (e.g., using barring messages 442 and 522). Accordingly, the UE RRC layer 404 maintains multiple bar timers that are associated with the different groups of access classes. In this example, the multiple bar timers include the common bar timer of FIG. 4, which is associated with a set of access classes containing at least two access classes, and the specific bar timer of FIG. 5, which is associated with the third access class 508. In contrast to FIG. 5, the specific bar timer of FIG. 6 expires after the common bar timer. Similar to FIG. 5, the third access class 508 can be an access class available to the UE 110 (e.g., AC3) or an access class reserved for the RAN 140 (e.g., AC37). In some situations, the third access class 508 can be a different access class than the first access class 422 and the second access class 444. In other situations, the third access class 508 and the second access class 444 can be a same access class.

At 605, the operations identified by A2 or the operations identified by both A1 and A2 occur, as described above with respect to FIG. 5. As such, the UE RRC layer 404 informs the UE upper layer 402 that the third access class 508 is barred. In this case, a value of the second wait time 516 causes the specific bar timer to expire after the common bar timer expires. At 610, the operations identified by B through D occur as described above with respect to FIG. 4. During this time, the common bar timer expires and UE RRC layer 404 sends the alleviation message 456 to the UE upper layer 402 to indicate alleviation of the barring of the at least two access classes (the first access class 422 and the second access class 444).

In this case, the barring of the third access class 508 is not alleviated using the alleviation message 456 of FIG. 4 (e.g., the third access class 508 is not included in the alleviation message 456) because the specific bar timer for the third access class 508 is still running. Accordingly, the UE upper layer 402 considers the third access class 508 as barred during the operations at 610.

At 615, the specific bar timer expires and the UE RRC layer 404 sends a second alleviation message 622 to the UE upper layer 402 at 620. In this case, the second alleviation message 622 indicates that barring of the third access class 508 is alleviated. Although not explicitly shown, the UE can also perform operations identified by F in FIG. 4 after the RRC layer sends the alleviation message 622 at 620. By sending multiple alleviation messages (e.g., the alleviation message 456 at 455 and the second alleviation message 622 at 620), the UE RRC layer 404 can inform the UE upper layer 402 that different access classes are alleviated at different times, even if the access classes have similar access category types. For example, the UE RRC layer 404 can inform the UE upper layer 402 that the AC7 is alleviated using the alleviation message 456 and can inform the UE upper layer 402 that the AC37 is alleviated using the alleviation message 622.

Figure 7:
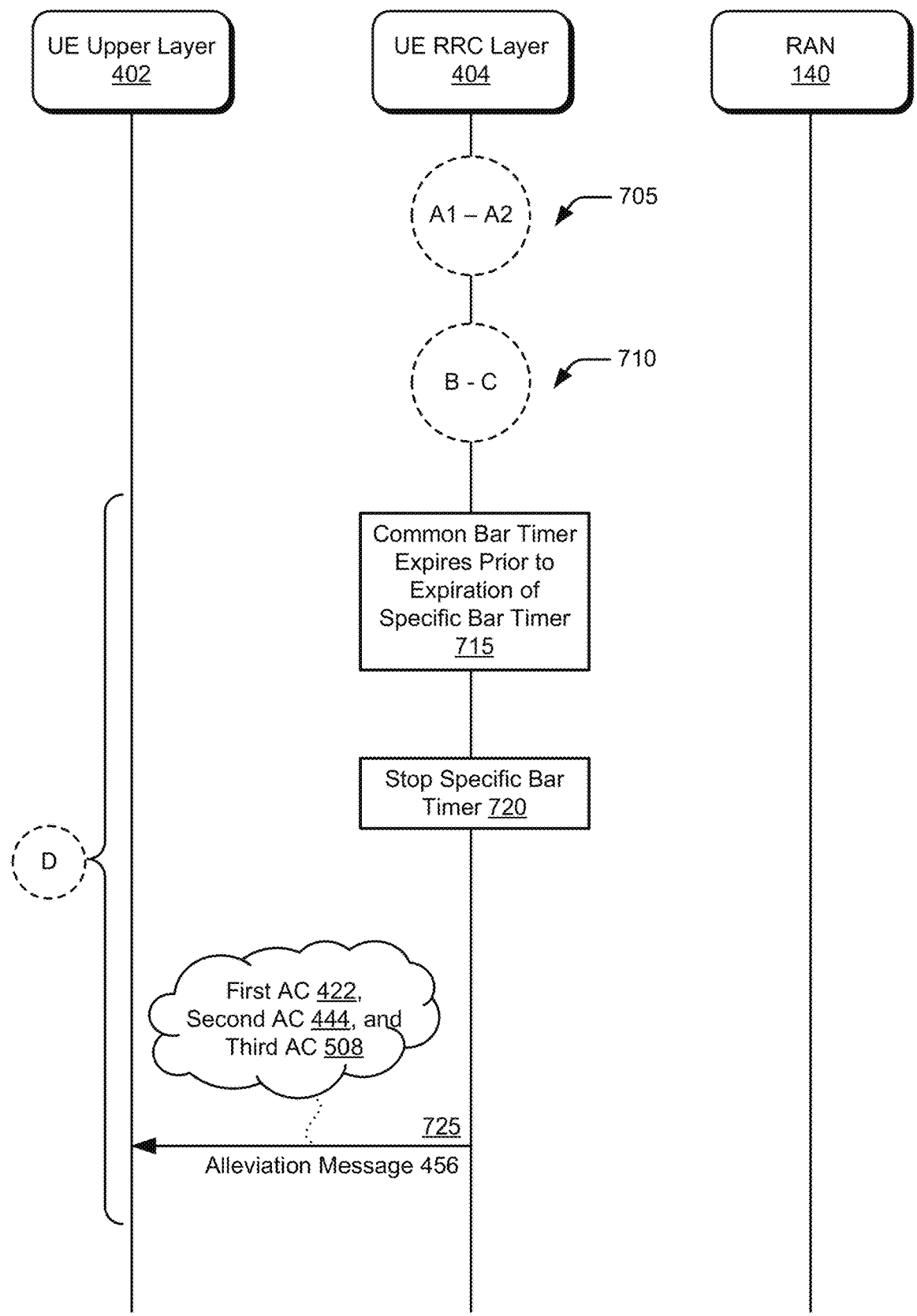
FIG. 7 illustrates details of example control transactions between entities for informing an upper layer of barring alleviation for multiple access classes associated with different bar timers at a same time.

FIG. 7 illustrates details of example control transactions between entities for informing an upper layer of barring alleviation for multiple groups of access classes associated with different bar timers running during overlapping time periods. For simplicity, similar transactions previously described with respect to FIGS. 4 and 5 are not shown explicitly and are generically referenced using identifiers A1 through F. Similar to FIGS. 5 and 6, the UE RRC layer 404 in FIG. 7 informs the UE upper layer 402 of multiple groups of access classes that are barred using multiple barring messages (via the barring message 522 of FIG. 5 and using the barring message 442 of FIG. 4). Accordingly, the UE RRC layer 404 maintains multiple bar timers such as the common bar timer of FIG. 4 and the specific bar timer of FIG. 5. Instead of sending the second alleviation message 622 upon expiration of the specific bar timer as shown in FIG. 6, however, the UE RRC layer 404 of FIG. 7 sends a single alleviation message 456 for the multiple sets of access classes. Similar to FIGS. 5 and 6, the third access class 508 can be an access class available to the UE 110 (e.g., AC3) or an access class reserved for the RAN 140 (e.g., AC37). In some situations, the third access class 508 can be a different access class than the first access class 422 and the second access class 444. In other situations, the third access class 508 and the second access class 444 can be a same access class.

At 705, operations identified by A1 and A2 can be performed as described with respect to FIG. 5. In this case, a value of the second wait time 516 causes the specific bar timer to expire after the common bar timer expires. At 710, operations identified by B and C can be performed as described with respect to FIG. 4.

As part of the operations identified by D, the common bar timer expires prior to an expiration of the specific bar timer at 715. Responsive to the common bar timer expiring, the UE RRC layer 404 stops the specific bar timer at 720 and sends the alleviation message 456 to the UE upper layer 402 at 725. In this example, the alleviation message 456 indicates alleviation of the barring of both sets of access classes (the first access class 422, the second access class 444, and the third access class 508). In this manner, the third access class 508 can be alleviated prior to an expiration of the specific bar timer when the specific bar timer is set to expire after the common bar timer. In FIG. 7, a single alleviation message 456 informs the UE upper layer 402 of barring alleviation for multiple sets of access classes that are associated with different bar timers responsive to the common bar timer expiring before the specific bar timer expires. Although not explicitly shown, the UE can also perform operations identified by E and F in FIGS. 4 and 6 after the RRC layer sends alleviation message 456 at 725.

Figure 8:
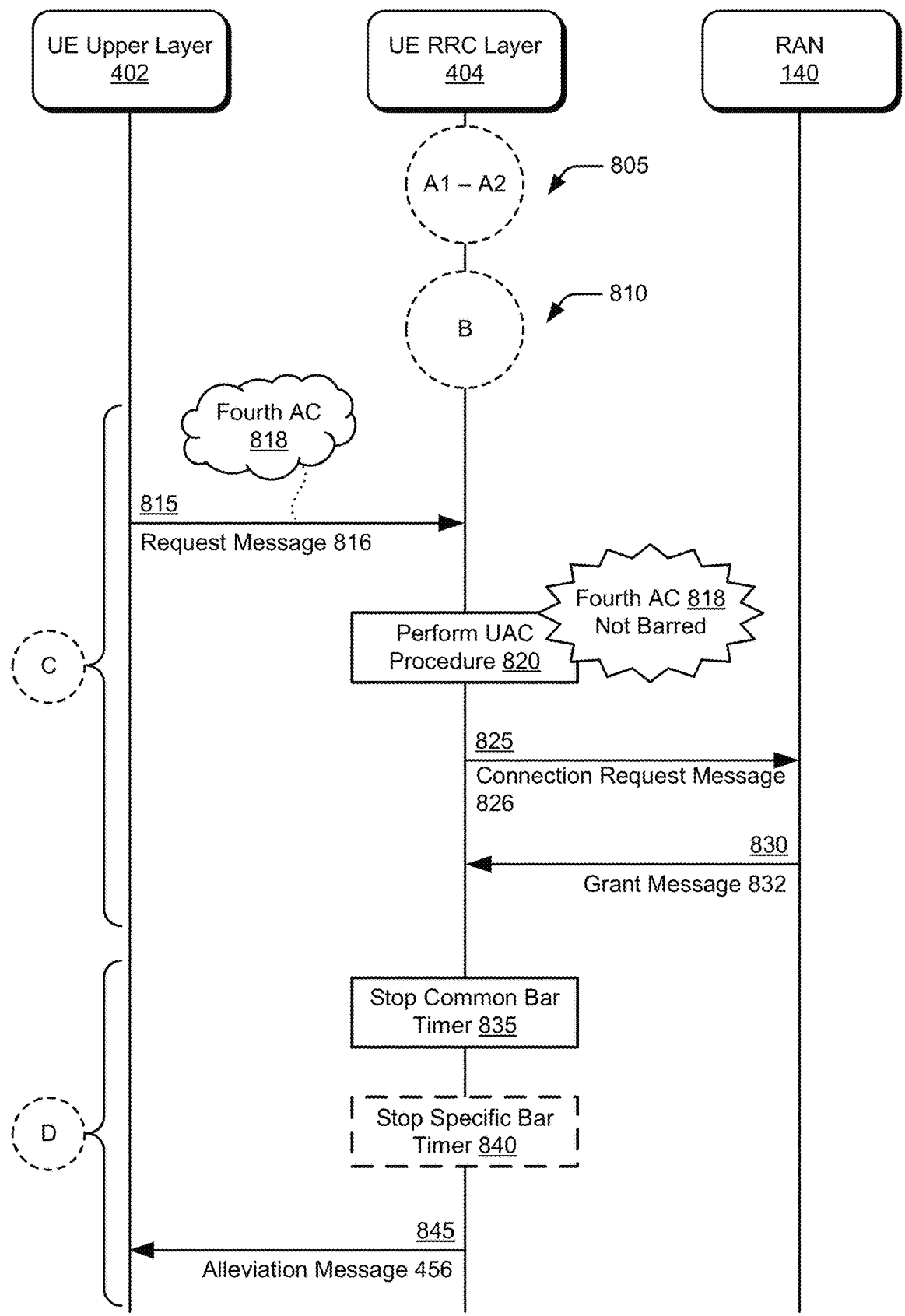
FIG. 8 illustrates details of example control transactions between entities for informing an upper layer of barring alleviation for multiple access classes responsive to receiving approval to establish a connection.

FIG. 8 illustrates details of example control transactions between entities for informing an upper layer of barring alleviation for multiple access classes responsive to receiving approval to establish a connection. For simplicity, similar transactions that are described above with respect to FIG. 4-7 are not shown explicitly. Instead, these transactions or operations are generically referenced using the identifiers A1 through F. In this situation, an operation within the transactions identified by C direct the UE RRC layer 404 to stop the common bar timer and inform the UE upper layer 402 of barring alleviation for at least two access classes.

At 805 and 810, operations identified by A1 and A2 in FIG. 5 and operations identified by B in FIG. 4 can be performed. During the operations of B, the RRC layer starts a common bar timer as shown by element 435 in FIG. 4. At 815, the UE RRC layer 404 receives a request message 816 indicating a fourth access class 818 that is not included in the set of at least two access classes in a barring message 442, which directs the UE RRC layer to attempt to establish a connection with the RAN 140.

At 820, the UE RRC layer 404 performs the UAC procedure, which determines that the fourth access class 818 is not barred. As an example, the fourth access class 818 can be an exempt access class, such as AC0 or AC2. Based on the determination that the fourth access class 818 is not barred, the UE RRC layer 404 proceeds to attempt to establish the connection with the RAN 140 by sending a connection request message 826 at 825.

At 830, the UE RRC layer 404 receives a grant message 832 from the RAN 140 that approves the UE RRC layer 404's request to establish the connection using the fourth access class 818. The grant message 832 can be an RRC setup message or an RRC resume message.

At 835, responsive to receiving the grant message 832, the UE RRC layer 404 stops the common bar timer, which was previously started at 810 in response to the UE RRC layer 404 receiving the rejection message 432 as shown in FIG. 4 at element 435. The UE RRC layer 404 also sends the alleviation message 456 to the UE upper layer 402 at 845. The alleviation message 456 indicates that barring of the set of at least two access classes (e.g., the first access class 422 and the second access class 444) is alleviated. If a specific bar timer was started at 805 (as shown in FIG. 5 element 515), the specific bar timer can also be stopped at 840 in response to the UE RRC layer 404 receiving the grant message 832. Instead of waiting for the common bar timer to expire as described in FIGS. 4-7, the operations of FIG. 8 quickly inform the UE upper layer 402 that the access classes that were previously barred are alleviated responsive to the UE RRC layer 404 receiving the grant message 832. Although not explicitly shown, the UE can also perform operations identified by E and F in FIGS. 4 and 6 after the RRC layer sends alleviation message 456 at 845.

Figure 9:
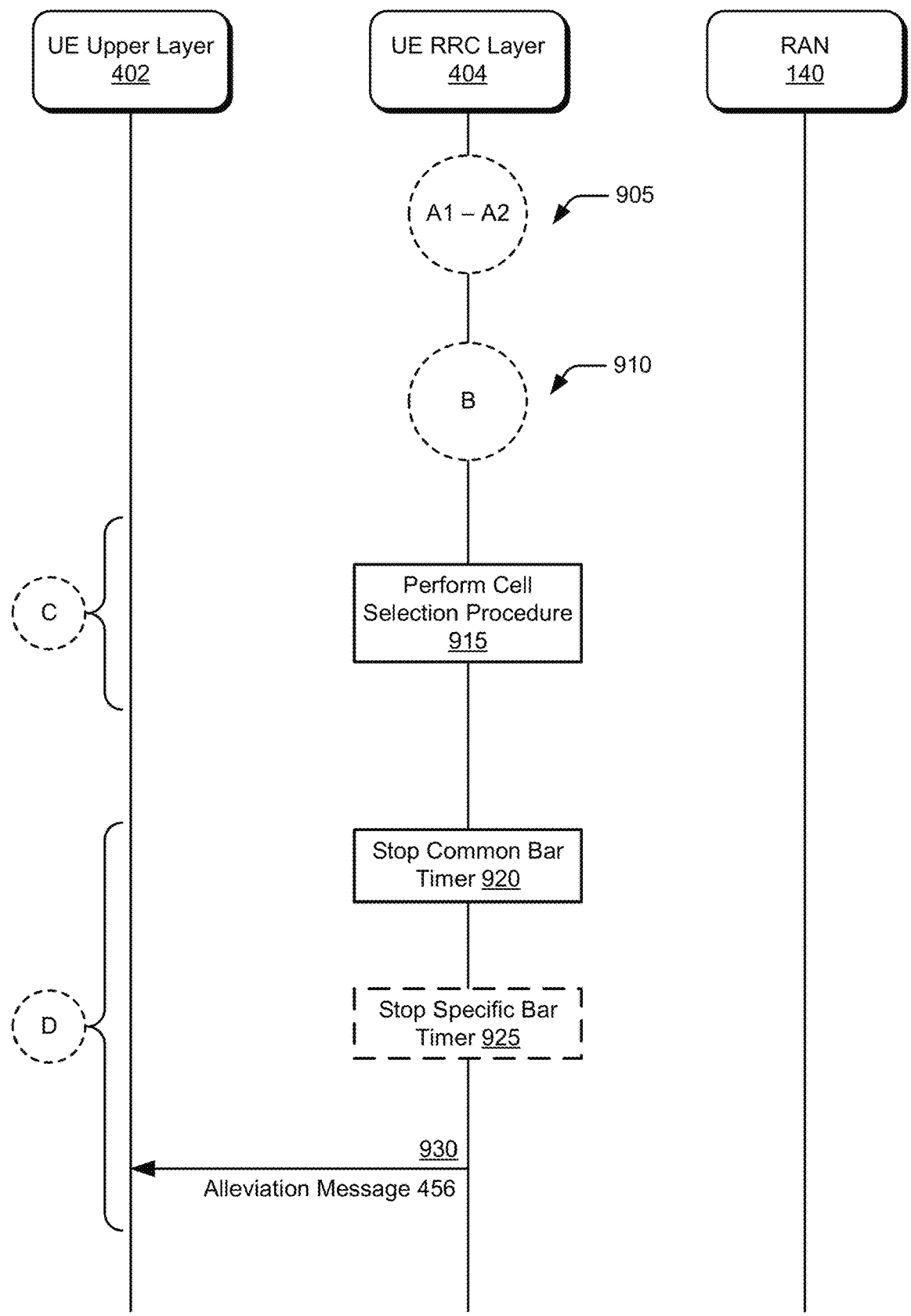
FIG. 9 illustrates details of example control transactions between entities for informing an upper layer of barring alleviation for multiple access classes responsive to selection of a different cell.

FIG. 9 illustrates details of example control transactions between entities for informing an upper layer of barring alleviation for multiple access classes responsive to a selection of a different cell. For simplicity, similar transactions as described above with respect to FIGS. 4-7 are not shown explicitly and are generically referenced using identifiers A1 through F. In this situation, an operation within the transactions identified by C direct the UE RRC layer 404 to stop the common bar timer and inform the UE upper layer 402 of alleviation of the barring of multiple access classes.

At 905 and 910, operations identified by A1 and A2 of FIG. 5 and operations identified by B of FIG. 4 can be performed. During the operations of B, the common bar timer starts as shown by element 435 in FIG. 4. Prior to the operations identified by C, the UE RRC layer 404 selects a first cell while in a disconnected RRC state (see FIG. 4 element 410).

At 915, the UE RRC layer 404 performs a cell selection procedure (e.g., a cell selection or a cell re-selection procedure) that selects a second cell that differs from the first cell. The cell selection procedure can be performed in response to the UE 110 moving to a different location or in response to a PLMN selection request (not shown) received by the UE RRC layer 404 from the UE upper layer 402.

Responsive to the selection of the second cell, the UE RRC layer 404 stops the common bar timer at 920 and sends the alleviation message 456 to the UE upper layer 402 at 930. The alleviation message 456 indicates alleviation of the barring of the at least two access classes (e.g., first access class 422 and second access class 444). If a specific bar timer was started at 905 (as shown in FIG. 5 element 515), the specific bar timer can also be stopped at 925 in response to the UE RRC layer 404 selecting the second cell. Instead of waiting for the common bar timer to expire as described in FIGS. 4-7, the operations of FIG. 9 quickly inform the UE upper layer 402 that access classes that were previously barred are alleviated responsive to the UE RRC layer 404 selecting the different cell. Although not explicitly shown, the UE can also perform operations identified by E and F in FIGS. 4 and 6 after the RRC layer sends the alleviation message 456 at 930.

Generally, the operations and transactions described with respect to FIGS. 4-9 can be combined in a variety of different ways. For example, operations identified by A1 and A2, may or may not occur in different situations. Sometimes, more than two specific bar timers associated with different particular access classes may be setup during A2 and one or more of these timers may be stopped responsive to the common bar timer expiring (as shown in FIG. 7) while one or more other timers are allowed to expire independent of the common bar timer (as shown in FIGS. 5 and 6). As another example, the common bar timer in FIGS. 4-7 or the specific bar timer in FIGS. 5-7 can be stopped responsive to the grant message 832 in FIG. 8 or the cell selection procedure of element 915 in FIG. 9. In other cases, the third access class 508 described in FIGS. 5 and 7 can be the second access class 444 that is also barred due to the rejection message 432 in FIG. 4.

In the examples above, the common bar timer is associated with a group of at least two access classes. For situations in which the common bar timer is associated with a single access class, such as the first access class 422, the operations for informing an upper layer of barring alleviation for multiple access classes as described in FIGS. 5-7 can still occur. In this case, the barring message 442 of FIG. 4 indicates that the first access class 422 is temporarily barred (the second access class 444 is not barred). However, other access classes may be previously barred, such as the third access class 508 as described in FIG. 5. Alleviation of the first access class 422 and the third access class 508 can therefore occur using a single alleviation message 456 (as described in FIGS. 5 and 7) or using multiple alleviation messages 456 (as described in combinations of FIGS. 4 and 6).

Example Method

Figure 10:
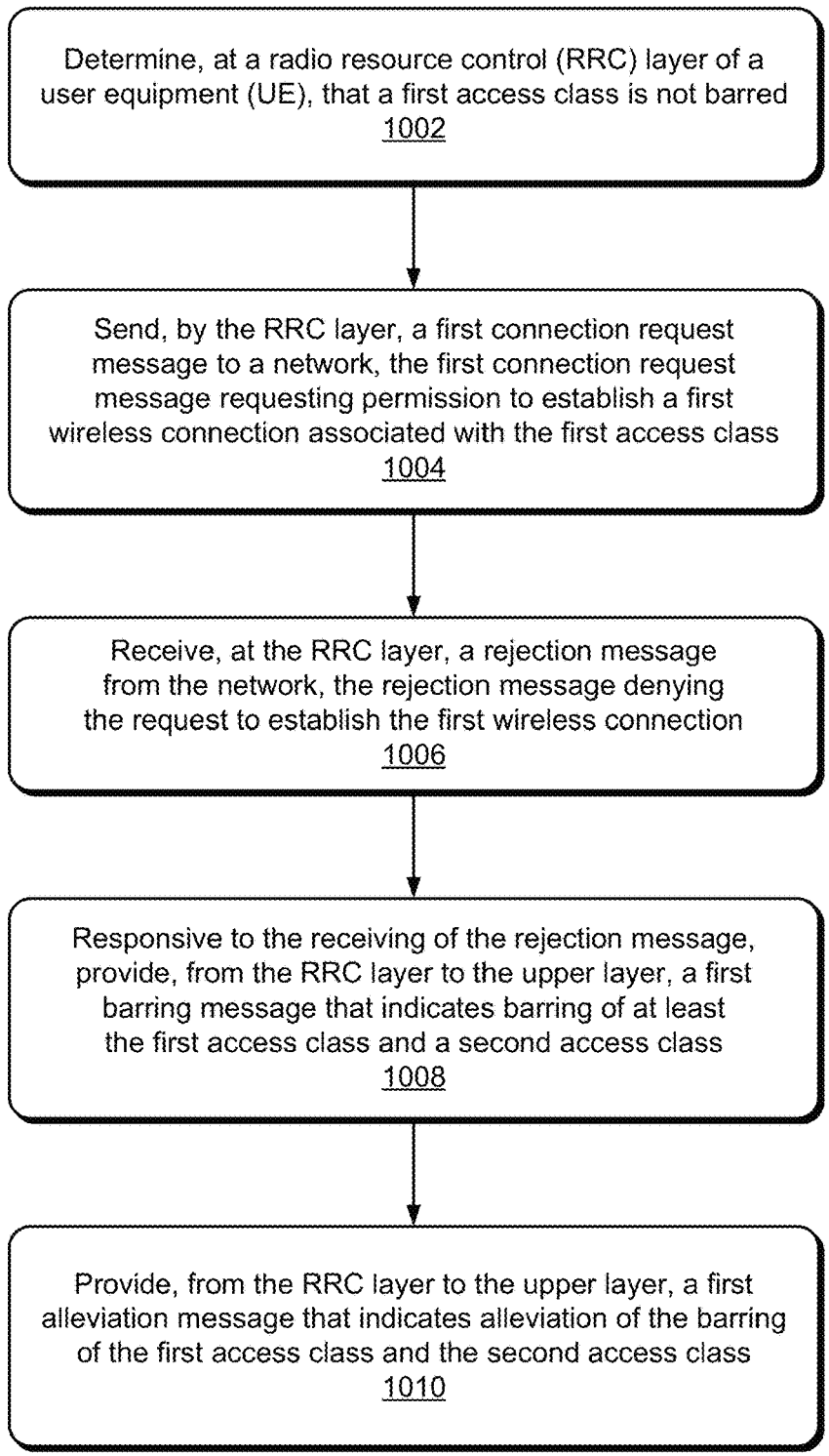
FIG. 10 illustrates an example method for informing an upper layer of barring alleviation for multiple access classes.

FIG. 10 depicts an example method 1000 for informing an upper layer of a UE of barring alleviation for multiple access classes. Method 1000 shows a set of operations (or acts) performed but not necessarily limited to the order or combinations in which the operations are illustrated. Further, any of one or more of the operations may be repeated, combined, reorganized, or linked to provide a wide array of additional and/or alternative methods. In portions of the following discussion, reference may be made to environment 100 of FIG. 1 and entities detailed in FIGS. 2-9, reference to which is made for example only. The techniques are not limited to performance by one entity or multiple entities operating on one device.

At 1002, an RRC layer of a UE determines that a first access class is not barred. For example, the UE RRC layer 404 of the UE 110 determines that the first access class 422 is not barred, as shown at 420 in FIG. 4. This determination can be made as part of the UAC procedure.

At 1004, the RRC layer sends a first connection request message to a network. The first connection request message requests permission to establish a first wireless connection associated with the first access class. For example, the UE RRC layer 404 sends the connection request message 426 to the RAN 140 to request permission to establish (or re-establish) a first wireless connection associated with the first access class 422, as shown at 425 in FIG. 4.

At 1006, the RRC layer receives a rejection message from the network. The rejection message denies the request to establish the first wireless connection. The set of at least two access classes include the first access class and a second access class. For example, the UE RRC layer 404 receives from the RAN 140 the rejection message 432 using lower layers. The rejection message 432 denies the UE RRC layer 404's request to establish the first wireless connection using the first access class, as shown at 430 in FIG. 4. The rejection message 432 directs the UE RRC layer 404 to determine that the first access class 422 and the second access class 444 are temporarily barred. A wait time 434 included within the rejection message 432 can indicate a duration for which the first access class 422 and the second access class 444 are barred.

At 1008, responsive to the receiving of the rejection message, the RRC layer provides a first barring message to the upper layer. The barring message indicates barring of at least the first access class and a second access class. For example, responsive to receiving the rejection message 432 at 430 in FIG. 4, the UE RRC layer 404 provides the UE upper layer 402 the barring message 442 at 440 in FIG. 4, which indicates barring of at least two access classes. The at least two access classes can include the first access class 422 and the second access class 444, as shown in FIG. 4, the first access class 422 and the third access class 508 of FIG. 6, or the first access class 422, the second access class 444, and the third access class 508.

In other situations, multiple barring messages may be provided from the RRC layer to the upper layer at different times. For example, the barring message 442 can be provided to the UE upper layer 402 with one or more access classes (e.g., the first access class 422 and/or the second access class 444), as described above, and the barring message 522 can be provided to the UE upper layer 402 with the third access class 508, as shown at 520 in FIG. 5.

At 1010, the RRC layer provides a first alleviation message to the upper layer. The first alleviation message indicates alleviation of the barring of the at least two access classes. For example, the UE RRC layer 404 provides the UE upper layer 402 the alleviation message 456 that indicates barring of the at least two access classes is alleviated, as shown at 455 in FIG. 4. This enables the UE upper layer 402 to direct the UE RRC layer 404 to send a second connection request message to the RAN 140, as shown by the UE upper layer 402 sending the second request message 466 to the UE RRC layer 404 at 465 in FIG. 4. The second connection request message requests permission to establish a second wireless connection associated with one access class of the at least two access classes, such as either the first access class 422, the second access class 444, or the third access class 508.

In general, the access classes included within the alleviation message 456 correspond to at least two of the access classes that are included within the one or more barring messages. Therefore the at least two access classes included within the alleviation message 456 can include the first access class 422, the second access class 444, and/or the third access class 508. Sometimes the access classes in the alleviation message 456 can be associated with different barring messages and different bar timers (e.g., such as the first access class 422 of FIG. 4 and the third access class 508 of FIG. 6). Sometimes an additional alleviation message can be sent for another access class that is not included within the barring message 442, such as the alleviation message 622 of FIG. 6.

In different situations, the UE RRC layer 404 can send the alleviation message 456 in response to the common bar timer expiring as shown in FIGS. 4, 5, and 7, in response to receipt of the grant message 832 from the RAN 140 as shown in FIG. 8, or in response to a cell selection procedure as shown in element 915 in FIG. 9.

Conclusion

Although techniques for informing an upper layer of barring alleviation for multiple access classes have been described in language specific to features and/or methods, it is to be understood that the subject of the appended claims is not necessarily limited to the specific features or methods described. Rather, the specific features and methods are disclosed as example implementations of informing an upper layer of barring alleviation for multiple access classes. Some examples are described below.

Example 1: A user equipment (UE) comprising:
  a processor and memory system coupled to a radio-frequency transceiver and configured to implement a protocol stack including a radio resource control (RRC) layer and an upper layer;
  the RRC layer configured to:
    determine that a first access class is not barred;
    send, to a network, a first connection request message to request establishment of a first connection associated with the first access class;
    receive, from the network, a rejection message that denies the request to establish the first connection;
    responsive to receiving the rejection message, send, to the upper layer, a first barring message that indicates barring of at least the first access class and a second access class;
    send, to the upper layer, a first alleviation message that indicates alleviation of the barring of the first access class and the second access class;
    receive a first request message from the upper layer associated with one access class of the first access class and the second access class; and
    responsive to receiving the first request message, send a second connection request message to the network to request establishment of a second connection associated with the one access class.

Example 2: The UE of example 1, wherein the RRC layer is further configured to:
  perform a unified access control (UAC) procedure,
  wherein the first access class is determined to not be barred based on the UAC procedure.

Example 3: The UE of example 1, wherein the rejection message includes a first wait time indicating a duration for which the first access class and the second access class are temporarily barred, further comprising:
  a common bar timer;
  wherein the RRC layer is further configured to:
    start the common bar timer with the first wait time responsive to receiving the rejection message,
    wherein the first alleviation message is sent responsive to an expiration of the common bar timer.

Example 4: The UE of example 3, wherein the RRC layer is further configured to:
  prior to sending the first alleviation message, determine whether a specific bar timer associated with the first access class or the second access class is active or inactive,
  wherein the first alleviation message indicates alleviation of the barring of the first access class or the second access class responsive to a determination that the specific bar timer is inactive.

Example 5: The UE of example 3, further comprising:
  a specific bar timer;
  wherein the RRC layer is further configured to:
    prior to the determination that the first access class is not barred, receive a second request message from the upper layer associated with a third access class that is different from the first access class and the second access class;
    determine that the third access class is barred;
    send, to the upper layer, a second barring message that indicates barring of the third access class;
    start the specific bar timer with a second wait time that causes the specific bar timer to expire after the common bar timer expires; and
    responsive to an expiration of the specific bar timer, send, to the upper layer, a second alleviation message that indicates alleviation of the barring of the third access class.

Example 6: The UE of example 5, wherein the third access class and the first access class are associated with a same access category type and have different access category numbers.

Example 7: The UE of example 3, further comprising:
  a specific bar timer;
  wherein the RRC layer is further configured to:
    prior to the determination that the first access class is not barred, receive a second request message from the upper layer associated with the second access class;
    determine that the second access class is barred;
    send, to the upper layer, a second barring message that indicates barring of the second access class;
    start the specific bar timer with a second wait time that causes the specific bar timer to expire after the common bar timer expires; and
    responsive to the expiration of the common bar timer:
      stop the specific bar timer; and
      send, to the upper layer, the first alleviation message.

Example 8: The UE of example 3, further comprising:
  a specific bar timer;
  wherein the RRC layer is further configured to:
    prior to the determination that the first access class is not barred, receive a second request message from the upper layer associated with the second access class;
    determine that the second access class is barred;
    send, to the upper layer, a second barring message that indicates barring of the second access class;
    start the specific bar timer with a second wait time that causes the specific bar timer to expire before the common bar timer expires; and
    responsive to the expiration of the common bar timer send, to the upper layer, the first alleviation message.

Example 9: The UE of example 1, wherein the RRC layer is further configured to:
  prior to the determination that the first access class is not barred, select a first cell;
  after sending the first barring message, perform a cell selection procedure that selects a second cell different from the first cell; and
  responsive to the selection of the second cell, send, to the upper layer, the first alleviation message.

Example 10: The UE of example 9, wherein the rejection message includes a first wait time indicating a duration for which the first access class and the second access class are temporarily barred, further comprising:

a common bar timer;
wherein the RRC layer is further configured to:
start the common bar timer with the first wait time responsive to receiving the rejection message; and
stop the common bar timer responsive to the selection of the second cell.

Example 11: The UE of example 1, wherein the RRC layer is further configured to:
inform the upper layer, using the barring message, that at least one exempt access class is not barred;
wherein the at least one exempt access class is associated with at least one of the following access category types:
a mobile-terminated (MT) access type; or
an emergency type.

Example 12: The UE of example 1, wherein the RRC layer is further configured to:
determine, after sending the first barring message, that a third access class of the at least one exempt access class is not barred, the third access class being different than the first access class and the second access class;
send, to the network, a third connection request message to request establishment of a third connection associated with the third access class;
receive, from the network, a grant message that approves the requested establishment of the third connection; and
responsive to receiving the grant message, send, to the upper layer, the first alleviation message.

Example 13: The UE of example 12, wherein the rejection message includes a first wait time indicating a duration for which the first access class and the second access class are temporarily barred, further comprising:
a common bar timer;
wherein the RRC layer is further configured to:
start the common bar timer with the first wait time responsive to receiving the rejection message; and
stop the common bar timer responsive to receiving the grant message.

Example 14: A method for informing an upper layer of a user equipment (UE) of barring alleviation for multiple access classes, the method comprising the UE performing operations including:
determining, at a radio resource control (RRC) layer of the UE, that a first access class is not barred;
sending, by the RRC layer, a first connection request message to a network, the first connection request message requesting permission to establish a first wireless connection associated with the first access class;
receiving, at the RRC layer, a rejection message from the network, the rejection message denying the request to establish the first wireless connection;
responsive to the receiving of the rejection message, providing, from the RRC layer to the upper layer, a first barring message that indicates barring of at least the first access class and a second access class; and
providing, from the RRC layer to the upper layer, a first alleviation message that indicates alleviation of the barring of the first access class and the second access class.

Example 15: The method of example 14, further comprising performing a unified access control procedure at the RRC layer of the UE; and
wherein the determining that the first access class is not barred is based on the unified access control procedure.

Example 16: The method of example 14, wherein the rejection message includes a first wait time indicating a duration for which the first access class and the second access class are temporarily barred, and further comprising:

responsive to receiving the rejection message, starting, at the RRC layer, a common bar timer with the first wait time,
wherein the providing of the first alleviation message is responsive to an expiration of the common bar timer.

Example 17: The method of example 16, further comprising:
prior to the determining that the first access class is not barred, receiving, at the RRC layer from the upper layer, a first request message associated with a third access class that is different from the first access class and the second access class;
determining, at the RRC layer, that the third access class is barred;
providing, from the RRC layer to the upper layer, a second barring message that indicates barring of the third access class;
starting a specific bar timer with a second wait time that causes the specific bar timer to expire after the common bar timer expires; and
responsive to an expiration of the specific bar timer, providing, from the RRC layer to the upper layer, a second alleviation message that indicates alleviation of the barring of the third access class.

Example 18: The method of example 16, further comprising:
prior to the determining that the first access class is not barred, receiving, at the RRC layer from the upper layer, a second request message associated with the second access class;
determining, at the RRC layer, that the second access class is barred;
providing, from the RRC layer to the upper layer, a second barring message that indicates barring of the second access class;
starting a specific bar timer with a second wait time that causes the specific bar timer to expire after the common bar timer expires; and
responsive to the expiration of the common bar timer, stopping the specific bar timer.

Example 19: The method of example 14, further comprising:
selecting, prior to the determining that the first access class is not barred, a first cell; and
performing, after the providing of the first barring message, a cell selection procedure that selects a second cell different than the first cell,
wherein the providing the first alleviation message is responsive to the performing of the cell selection procedure.

Example 20: The method of example 14, further comprising:
determining, after the sending of the first barring message, that a third access class is not barred at the RRC layer, the third access class being different than the first access class and the second access class;
sending a second connection request message from the RRC layer to the network to request establishment of a second wireless connection associated with the third access class;
receiving, from the network at the RRC layer, a grant message that approves the second connection request message; and
responsive to the receiving of the grant message, providing, from the RRC layer to the upper layer, the first alleviation message.

What is claimed is:

1. A method for informing an upper layer of a user equipment of barring alleviation for multiple access classes, the method comprising the user equipment performing operations including:
   receiving, at a radio resource control layer from the upper layer, a first request message associated with a fourth access class that is different from a first access class and a second access class;
   determining, at the radio resource control layer, that the fourth access class is barred;
   providing, from the radio resource control layer to the upper layer, a second barring message that indicates barring of the fourth access class;
   starting a first specific bar timer with a first wait time;
   determining, at the radio resource control layer of the user equipment, that the first access class is not barred;
   sending, by the radio resource control layer, a first connection request message to a network, the first connection request message requesting permission to establish a first wireless connection associated with the first access class;
   receiving, at the radio resource control layer, a rejection message from the network, the rejection message denying the request to establish the first wireless connection;
   responsive to the receiving of the rejection message, providing, from the radio resource control layer to the upper layer, a first barring message that indicates barring of the first access class and the second access class;
   responsive to receiving the rejection message, activating, at the radio resource control layer, a common bar timer associated with the access classes identified in the first barring message;
   responsive to the common bar timer becoming inactive, determining whether or not respective specific bar timers associated with the first access class and the second access class are inactive;
   responsive to determining that the respective specific bar timers associated with the first access class and the second access class are inactive, determining that the barring of the first access class and the second access class is alleviated;
   providing, from the radio resource control layer to the upper layer, a first alleviation message that indicates alleviation of the barring of the first access class and the second access class; and
   if the first wait time causes the first specific bar timer to expire after the common bar timer becomes inactive, and responsive to an expiration of the first specific bar timer, providing, from the radio resource control layer to the upper layer, a second alleviation message that indicates alleviation of the barring of the fourth access class.

2. The method of claim 1, wherein:
   the first barring message indicates barring of the first access class, the second access class, and a third access class;
   the determining whether or not the respective specific bar timers associated with the first access class and the second access class are inactive comprises determining whether or not the respective specific bar timers associated with the first access class, the second access class, and the third access class are inactive;
   the determining that the barring of the first access class and the second access class is alleviated comprises determining that the barring of the first access class, the second access class, and the third access class is alleviated responsive to the determining that the respective specific bar timers associated with the first access class, the second access class, and the third access class are inactive; and
   the first alleviation message indicates alleviation of the barring of the first access class, the second access class, and the third access class.

3. The method of claim 1, further comprising:
   responsive to the first specific bar timer expiring prior to the common bar timing becoming inactive, determining that the barring of the fourth access class is also alleviated,
   wherein the first alleviation message indicates alleviation of the barring of the first access class, the second access class, and the fourth access class.

4. The method of claim 1, wherein the fourth access class and the first access class are associated with a same access category type and have different access category numbers.

5. The method of claim 1, further comprising:
   determining, after the sending of the first barring message, that a fifth access class is not barred at the radio resource control layer, the fifth access class being different than the first access class and the second access class;
   sending a second connection request message from the radio resource control layer to the network to request establishment of a second wireless connection associated with the fifth access class;
   receiving, from the network at the radio resource control layer, a grant message that approves the second connection request message; and
   responsive to the receiving of the grant message, stopping the common bar timer.

6. The method of claim 1, further comprising:
   prior to the determining that the first access class is not barred, receiving, at the radio resource control layer from the upper layer, a second request message associated with the second access class;
   determining, at the radio resource control layer, that the second access class is barred;
   providing, from the radio resource control layer to the upper layer, a third barring message that indicates barring of the second access class;
   starting a second specific bar timer with a second wait time that causes the second specific bar timer to expire after the common bar timer expires; and
   responsive to the common bar timer becoming inactive, stopping the second specific bar timer prior to the determining whether or not the respective specific bar timers associated with the first access class and the second access class are inactive.

7. The method of claim 1, further comprising:
   prior to the determining that the first access class is not barred, receiving, at the radio resource control layer from the upper layer, a second request message associated with the second access class;
   determining, at the radio resource control layer, that the second access class is barred;
   providing, from the radio resource control layer to the upper layer, a third barring message that indicates barring of the second access class; and
   starting a second specific bar timer with a second wait time that causes the second specific bar timer to expire before the common bar timer expires.

8. The method of claim 1, further comprising:
selecting, prior to the determining that the first access class is not barred, a first cell;
performing, after the providing the first barring message, a cell selection procedure that selects a second cell different than the first cell; and
responsive to selecting the second cell, stopping the common bar timer.

9. The method of claim 1, wherein:
the first barring message indicates that at least one exempt access class is not barred; and
the at least one exempt access class is associated with at least one of the following access category types:
a mobile-terminated access type; or
an emergency type.

10. The method of claim 1, further comprising:
performing a unified access control procedure at the radio resource control layer of the user equipment,
wherein the determining that the first access class is not barred is based on the unified access control procedure.

11. The method of claim 1, wherein:
the rejection message includes a third wait time indicating a duration for which the first access class and the second access class are temporarily barred; and
the activating the common bar timer comprises starting the common bar timer with the third wait time.

12. The method of claim 1, wherein the common bar timer becomes inactive based on the common bar timer expiring or the common bar timer stopping.

13. The method of claim 1, wherein the first access class and the second access class are non-exempt access classes.

14. A user equipment comprising:
a radio-frequency transceiver; and
a processor and memory system configured to:
receive, at a radio resource control layer from an upper layer, a first request message associated with a fourth access class that is different from a first access class and a second access class;
determine, at the radio resource control layer, that the fourth access class is barred;
provide, from the radio resource control layer to the upper layer, a second barring message that indicates barring of the fourth access class;
start a first specific bar timer with a first wait time;
determine, at the radio resource control layer of the user equipment, that the first access class is not barred;
send, by the radio resource control layer, a first connection request message to a network using the radio-frequency transceiver, the first connection request message requesting permission to establish a first wireless connection associated with the first access class;
receive, at the radio resource control layer, a rejection message from the network using the radio-frequency transceiver, the rejection message denying the request to establish the first wireless connection;
responsive to the receiving of the rejection message, provide, from the radio resource control layer to an upper layer, a first barring message that indicates barring of the first access class and the second access class;
responsive to receiving the rejection message, activate, at the radio resource control layer, a common bar timer associated with the access classes identified in the first barring message;
responsive to the common bar timer becoming inactive, determine whether or not respective specific bar timers associated with the first access class and the second access class are inactive;
responsive to determining that the respective specific bar timers associated with the first access class and the second access class are inactive, determine that the barring of the first access class and the second access class is alleviated;
provide, from the radio resource control layer to the upper layer, a first alleviation message that indicates alleviation of the barring of the first access class and the second access class; and
if the first wait time causes the first specific bar timer to expire after the common bar timer becomes inactive, and responsive to an expiration of the first specific bar timer, provide, from the radio resource control layer to the upper layer, a second alleviation message that indicates alleviation of the barring of the fourth access class.

15. A non-transitory processor-readable medium having instructions stored thereon that, when executed by a processor, cause the processor to:
receive, at a radio resource control layer from an upper layer, a first request message associated with a fourth access class that is different from a first access class and a second access class;
determine, at the radio resource control layer, that the fourth access class is barred;
provide, from the radio resource control layer to the upper layer, a second barring message that indicates barring of the fourth access class;
start a first specific bar timer with a first wait time;
determine, at the radio resource control layer of a user equipment, that the first access class is not barred;
send, by the radio resource control layer, a first connection request message to a network, the first connection request message requesting permission to establish a first wireless connection associated with the first access class;
receive, at the radio resource control layer, a rejection message from the network, the rejection message denying the request to establish the first wireless connection;
responsive to the receiving of the rejection message, provide, from the radio resource control layer to an upper layer, a first barring message that indicates barring of the first access class and the second access class;
responsive to receiving the rejection message, activate, at the radio resource control layer, a common bar timer associated with the access classes identified in the first barring message;
responsive to the common bar timer becoming inactive, determine whether or not respective specific bar timers associated with the first access class and the second access class are inactive;
responsive to determining that the respective specific bar timers associated with the first access class and the second access class are inactive, determine that the barring of the first access class and the second access class is alleviated; provide, from the radio resource control layer to the upper layer, a first alleviation message that indicates alleviation of the barring of the first access class and the second access class; and
if the first wait time causes the first specific bar timer to expire after the common bar timer becomes inactive, and responsive to an expiration of the first specific bar timer, provide, from the radio resource control layer to the upper layer, a second alleviation message that indicates alleviation of the barring of the fourth access class.

16. The user equipment of claim 14, wherein:

the first barring message indicates barring of the first access class, the second access class, and a third access class;

the processor and memory system are further configured to:

determine whether or not the respective specific bar timers associated with the first access class, the second access class, and the third access class are inactive; and determine that the barring of the first access class, the second access class, and the third access class is alleviated responsive to the determining that the respective specific bar timers associated with the first access class, the second access class, and the third access class are inactive; and the first alleviation message indicates alleviation of the barring of the first access class, the second access class, and the third access class.

17. The user equipment of claim 14, wherein:

the processor and memory system are further configured to:

responsive to the first specific bar timer expiring prior to the common bar timing becoming inactive, determine that the barring of the fourth access class is also alleviated; and the first alleviation message indicates alleviation of the barring of the first access class, the second access class, and the fourth access class.

18. The user equipment of claim 14, wherein the first access class and the second access class are non-exempt access classes.

19. The user equipment of claim 14, wherein the fourth access class and the first access class are associated with a same access category type and have different access category numbers.

20. The user equipment of claim 14, wherein:

the first barring message indicates that at least one exempt access class is not barred; and the at least one exempt access class is associated with at least one of the following access category types:

a mobile-terminated access type; or an emergency type.

\* \* \* \* \*